United States Patent [19]
Curry

[11] 3,846,749
[45] Nov. 5, 1974

[54] VEHICLE BRAKE LIGHT CONTROL SYSTEM

[75] Inventor: Renwick E. Curry, Hingham, Mass.

[73] Assignee: Massachusetts Institute of Technology, Cambridge, Mass.

[22] Filed: Feb. 1, 1973

[21] Appl. No.: 328,798

[52] U.S. Cl................................. 340/72, 340/262
[51] Int. Cl............................................. B60q 1/44
[58] Field of Search............................... 340/62, 72

[56] References Cited
UNITED STATES PATENTS

| | | | |
|---|---|---|---|
| 3,528,056 | 9/1970 | Voevodsky | 340/72 |
| 3,593,272 | 7/1971 | Blomenkamp et al. | 340/62 |
| 3,593,278 | 7/1971 | Bower et al. | 340/72 |
| 3,740,715 | 6/1973 | Szekessy | 340/72 |
| 3,771,122 | 11/1973 | Sattler | 340/62 |

Primary Examiner—Donald J. Yusko
Assistant Examiner—K. Leimer
Attorney, Agent, or Firm—Arthur A. Smith, Jr.; Robert F. O'Connell; Martin M. Santa

[57] ABSTRACT

A vehicle brake light control system, useful in an automobile, for example, which system causes the brake lights of the vehicle to flash on at a rate dependent on the sum of the deceleration of the vehicle and the derivative of such deceleration when the vehicle is decelerating without the application of the vehicle brakes, to remain on continuously when the brakes are applied and the vehicle deceleration is below a predetermined threshold level, and to flash off at a rate dependent on the sum of the vehicle deceleration and its derivative when the brakes are applied and the vehicle deceleration exceeds such predetermined threshold level.

12 Claims, 8 Drawing Figures

| | LOGIC "AND" GATE OUTPUTS | | | | | | "OR" GATE OUTPUT |
|---|---|---|---|---|---|---|---|
| | 31 | 32 | 33 | 34 | 35 | 36 | |
| I | 1 | 0 | 0 | A | 0 | 0 | A |
| II | 0 | 1 | 0 | 0 | B | 0 | B |
| III | 0 | 0 | 1 | 0 | 0 | $\bar{A}$ | $\bar{A}$ |

DECELERATION STATES

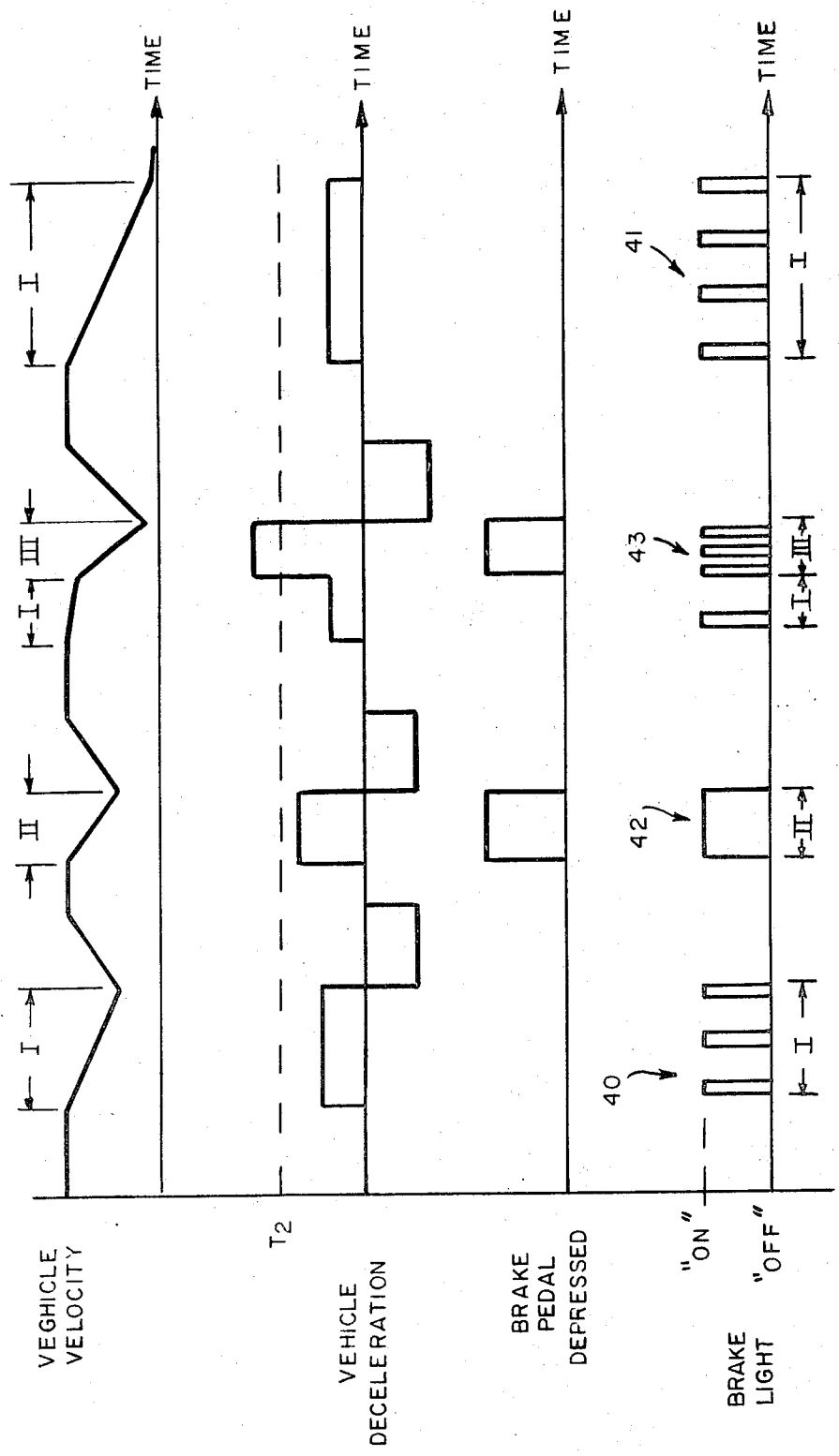

VEHICLE BRAKE LIGHT CONTROL SYSTEM

INTRODUCTION

This invention relates to a system for controlling the actuation of brake lights on a vehicle and, more particularly, to a system for controlling the flashing rate of brake lights in an automobile, for example, to increase their attention-getting capability.

BACKGROUND OF THE INVENTION

In assessing a braking situation, studies have shown that a driver who is observing the automobile directly in front of him uses deceleration "cues" obtained visually from certain dynamic characteristics of such vehicle as it is braked. Probably the most prominent cue used by many drivers is the elevation of the rear end of the automobile directly in front of them when the driver thereof has applied the brakes. Such visual deceleration cues are helpful to drivers in determining how severe the braking situation is so that they can act accordingly.

In many situations such a deceleration cue may not be available, as when visibility is poor in darkness, rain, snow, and the like, wherein only the tail lights of the car ahead may be seen. In conventionally used brake light systems, when the lights go on in a braking situation, without other clues, the driver behind knows only that the driver ahead has applied his brakes but has no real indication of how severely such driver may be attempting to decelerate. Moreover, if the forward driver is decelerating without applying his brakes, i.e., merely by removing his foot from the accelerator pedal, a rearward driver receives virtually no indication of such a decelerating condition.

For greater highway safety it is desirable, whenever a decelerating condition occurs, that an appropriate visual indication be given to the rearward driver or drivers, preferably via the rear brake lighting system which can usually be seen even under conditions of relatively poor visibility. Such indication should be arranged to provide sufficiently helpful information to the driver of the rearward vehicle so as to permit him to take the best course of action in the particular decelerating situation at hand. The relatively standard brake lighting systems used on most automobiles at the present time provide no information in a decelerating, but non-braking, situation and, further, often provide somewhat ambiguous information even under braking conditions. While certain modifications thereto have been proposed by the prior art in an effort to decrease such ambiguities, such modified systems have not always provided the optimum information needed to assess the situation and have not supplied any information in a non-braking but deceleration situation.

DESCRIPTION OF THE PRIOR ART

For example, it has been proposed that a vehicle brake lighting system make use of various colors, the colors being coded so that certain color combinations used therein provide selected information to the next rearward vehicle. However, no standard color system has yet been adopted for implementation and it is believed that the adoption thereof may create confusion as to the meaning thereof by many drivers. Further, such a system can best be implemented by incorporation of the brake light system design into the vehicle from its manufacture, it being difficult, or at least not feasible from a practical viewpoint, to retro-fit existing vehicles with such a system.

Another proposal is that the brake lights be placed at a position higher up on the vehicle. While such placement may aid in improving the attention-getting characteristics thereof, no better information concerning the braking or decelerating situation is provided. Moreover, as above, the practical problem of retro-fitting existing vehicles also arises with such a system.

Other proposals, which may not necessarily require the incorporation of the system into the vehicle at the inception of the vehicle design, have made use of a flashing light system for conveying information concerning the rate of deceleration to which the vehicle has been subjected when the brakes are applied. In one such a system, for example, the rear lights are caused to flash on and off at a constant rate for a predetermined time period whenever the brakes are applied and, thence, to remain on continuously during the remainder of the braking period, as described in U.S. Pat. No. 3,576,572 issued to Howard on Apr. 27, 1971.

In another system the brake light begins its constant rate flashing sequence once the deceleration reaches a selected threshold level and continues to flash at the same rate until the driver manually resets the system after reaching a safe, albeit sudden, stop.

In still another proposed system, described in U.S. Pat. No. 3,593,278, issued to Bower et al. on July 13, 1971, the brake light flashes at a rate proportional to the deceleration throughout the entire braking period, a more rapid flashing rate indicating a more severe decelerating situation.

In U.S. Pat. No. 3,529,056, issued to Voevodsky on Sept. 8, 1970, the brake lights are caused to flash at a rate exponentially related to the deceleration, via a non-linear impedance circuit, throughout the entire braking period.

In any of the above systems the drivers of the vehicles behind the vehicle which is being decelerated still do not have sufficient information to fully assess the decelerating situation of the vehicle ahead. Even in the flashing light systems, as described above, the rearward driver does not have the most attention-getting information as to how severely, or how casually, the driver ahead is attempting to decelerate under braking conditions and, further, has no information at all as to a decelerating, but non-braking, situation.

DESCRIPTION OF THE INVENTION

This invention, on the other hand, provides better and more complete information concerning a decelerating situation than those provided by the above discussed prior art systems and at the same time provides a convenient way of incorporating a rear light warning system, either at the time of the manufacture of the automobile in question or at a later time through appropriate retro-fitting techniques. The improved deceleration information available for the rearward driver provides him with a better indication as to the severity of the situation so that he can more quickly and more correctly respond thereto.

In the system of the invention means are provided for producing a pulsed signal, the pulse repetition rate of which is dependent on the sum of the deceleration of a vehicle and the rate of such deceleration (i.e., the derivative of deceleration) when a vehicle is decelerating both with and without application of the brakes. Such pulsed signal is then used to actuate the brake light system of a vehicle in a first deceleration situation wherein the brakes have not been applied by the driver of the vehicle so that the brake light is caused to flash "on" at a rate dependent on the sum of deceleration and its derivative. Further, the invention provides operation during a second decelerating situation when the brakes have been applied such that the brake light system is turned on continuously so long as the deceleration of the vehicle remains below a preselected threshold level. In a third decelerating situation wherein the brakes have been applied and the deceleration of the vehicle exceeds such threshold level, the pulsed signal is used to actuate the brake light system so that it is flashed "off" at a rate dependent on the sum of such deceleration and its derivative.

Thus, the system of the invention combines the attention-getting characteristics of flashing lights with the provision of improved information concerning the severity of the deceleration, i.e., the braking or non-braking urgency of the situation, through the use of a constant or a flashing brake light system which conveys better information which is clearly transmitted to the rearward driver.

The system of the invention can be described in more detail with reference to the accompanying drawings wherein:

FIG. 4 shows graphical representations of different exemplary decelerating states under which the invention operates and exemplary corresponding voltage waveforms of certain signals in the system shown in FIG. 2.

In the system of the invention as described with reference to the drawings, means are provided not only for getting the attention of the rearward driver but also for furnishing him with helpful deceleration cues so as to permit him to take the necessary action in a time period much less than he might normally have available when conventional brake light warning systems are used.

Figures 1, 3:
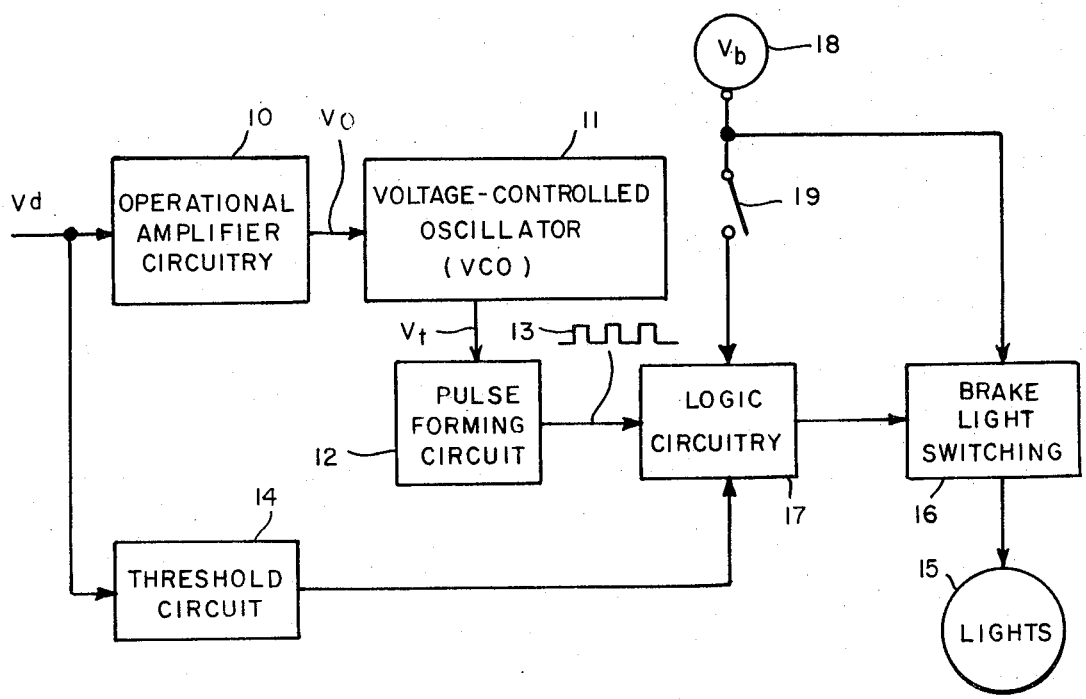
FIG. 1 shows a block diagram of the overall system of the invention.
FIG. 3 shows a table depicting the output logic states of the logic gates of the system depicted in FIG. 2 for different decelerating states of a vehicle.
Figures 1A, 1B, 1C:
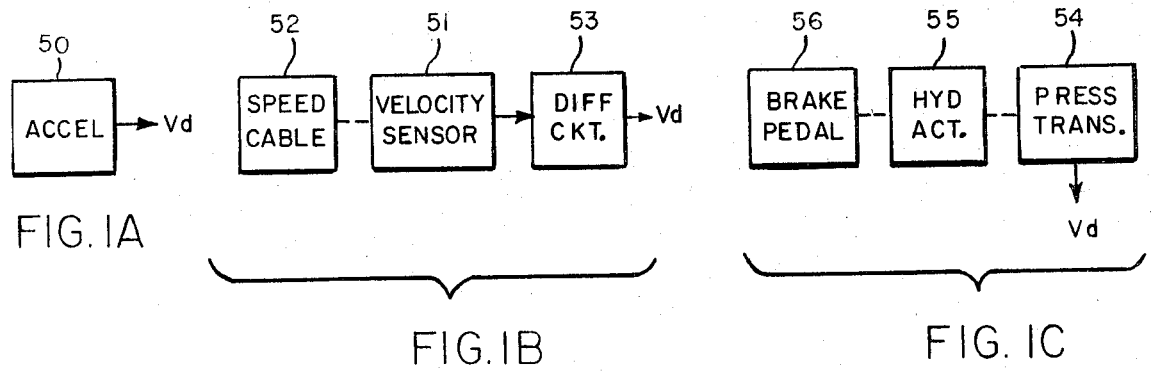
FIGS. 1A, 1B and 1C show block diagrams of various means for providing a voltage representing the deceleration of a vehicle for use in the system of FIG. 1.

As shown in FIG. 1, the system requires an appropriate means which measures a suitably selected physical vehicle characteristic so as to provide information concerning the deceleration thereof by producing a voltage $V_d$ which is representative of such deceleration. For example, a transducer, such as an accelerometer 50, may be appropriately mounted on the vehicle to measure the deceleration directly, as shown in FIG. 1A, or a velocity sensor means 51 may be used to measure the rotational velocity of the speedometer cable 52, or any other device whose angular velocity is proportional to vehicle speeds, by suitable connection thereto to obtain a voltage $V_v$ proportional to vehicle velocity, which voltage can be differentiated by appropriate differentiating circuitry 53 to produce a voltage proportional to deceleration, as shown in FIG. 1B.

Further, in vehicles utilizing hydraulic brake systems an appropriate hydraulic pressure transducer 54 is suitably connected to the hydraulic brake line actuator 55 to convert brake line pressure, as applied by the driver via brake pedal 56, to a voltage proportional thereto. A sufficiently linear relationship exists between brake line pressure and vehicle deceleration so that the voltage produced by such a pressure transducer is effectively representative of vehicle deceleration and can be utilized in substantially the same manner as the voltage supplied as discussed above with respect to the means shown in FIGS. 1A and 1B.

At any rate, a voltage is produced, which voltage is then fed to operational amplifier circuitry 10. As described in more detail below the circuitry provides an output voltage $V_o$ the level of which is dependent on the sum of the voltage $V_d$ and its time derivative $dV_d/dt$, which voltage is in turn applied to a voltage-controlled oscillator (VCO) circuit 11. The voltage controlled oscillator produces a square wave voltage $V_t$ having a frequency proportional to its input voltage $V_o$, voltage $V_t$ being used to trigger a pulse forming circuit 12 to produce a pulsed signal 13 as shown, the repetition rate of said pulsed signal thereby being effectively dependent on the sum of the deceleration and its derivative.

The deceleration voltage $V_d$ is also fed to a threshold circuit 14 which, when $V_d$ exceeds a selected level, produces an output voltage therefrom. A conventional braking voltage $V_b$ is available from a voltage supply 18 for operating brake lights 15 via brake light switching circuit 16, which is actuated in accordance with logic circuitry 17 as set forth in more detail below. The logic circuitry inputs are obtained from the outputs of pulse circuit 12, threshold circuit 14 and brake voltage supply 18, the latter being supplied via brake switch 19 which is actuated to close when the driver of the vehicle applies the brakes.

Figure 2A:
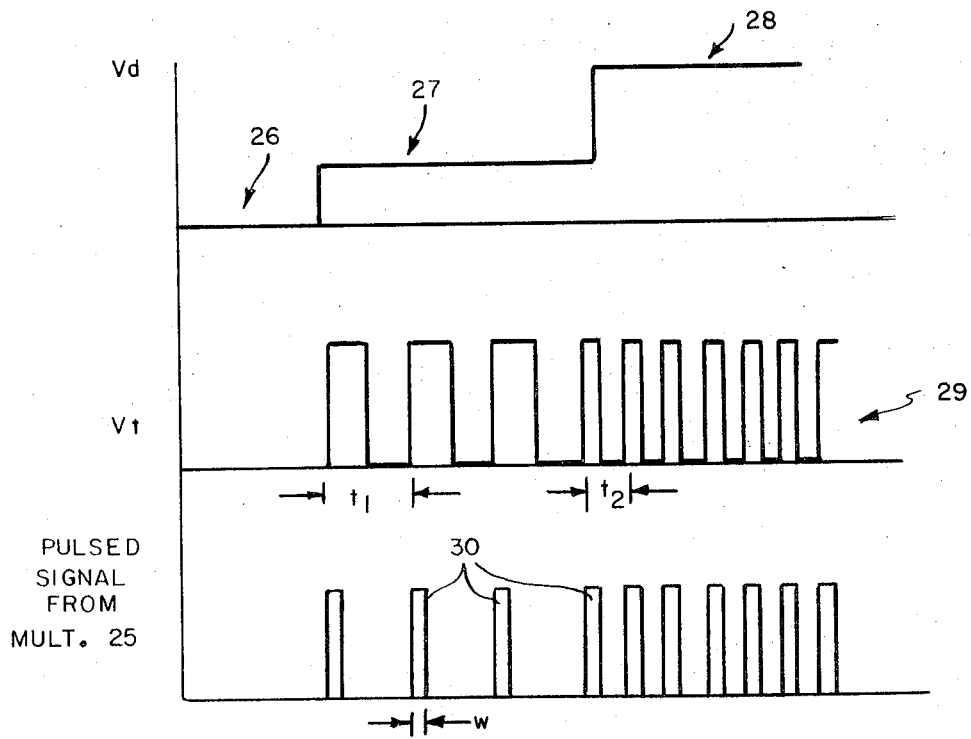
FIG. 2A shows graphical representations of the various signals present in the system of FIGS. 1 and 2.
Figure 2:
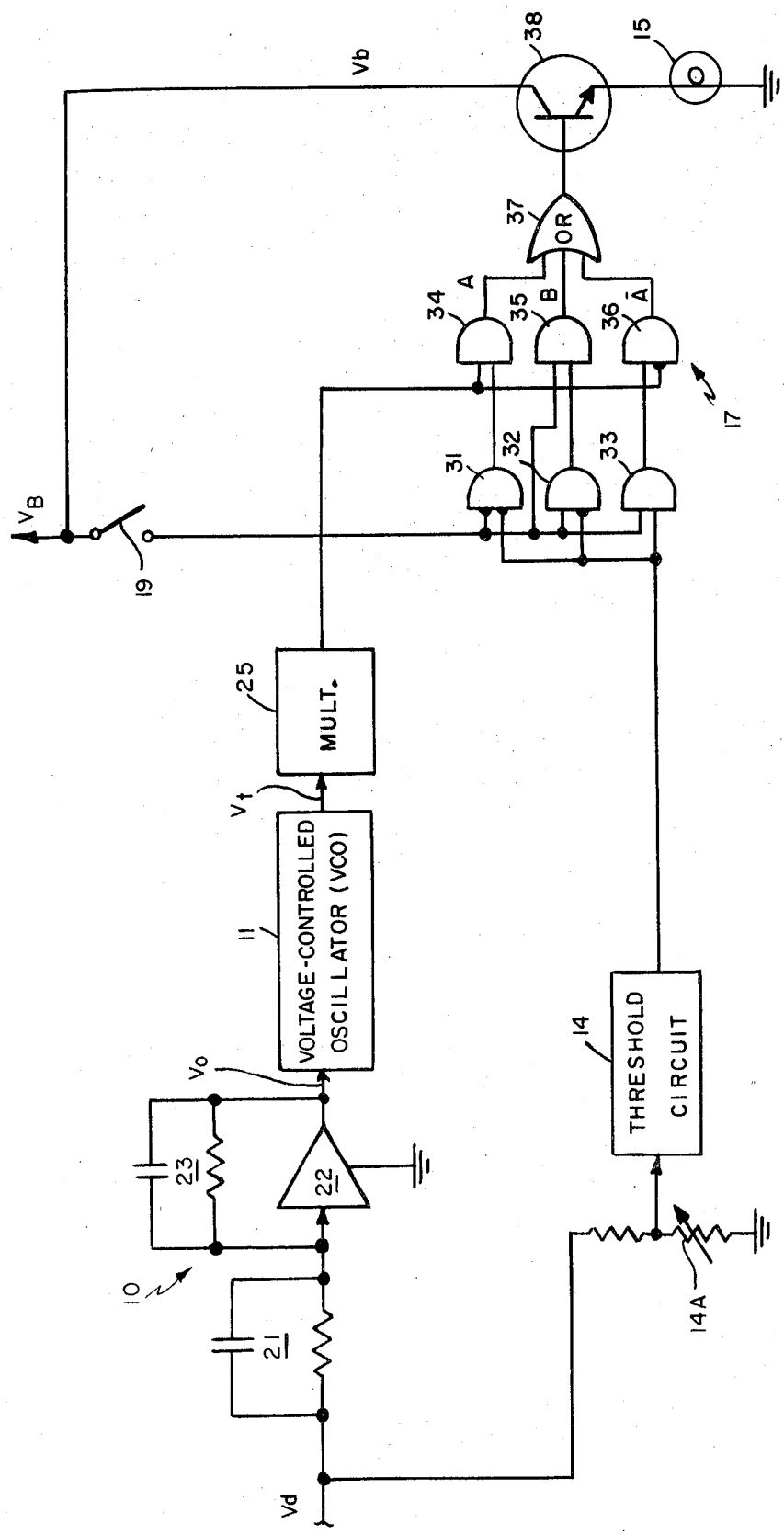
FIG. 2 shows a more detailed schematic and block diagram of the system of FIG. 1.

As can be seen in more detail in FIG. 2, operational amplifier 10 comprises a first input resistance-capacitance network 21 at the input of an amplifier 22 and a second feedback resistance-capacitance network 23 connected between the output and the input terminals of amplifier 22. The output terminal of the amplifier 22 is connected to the input of voltage controlled oscillator 11 which in turn provides the trigger voltage $V_t$ for triggering a pulse forming circuit in the form, for example, of a conventional one-shot multivibrator 25 which when triggered produces a pulse having a selected width determined by the time constant thereof.

In the operation of the circuitry of FIG. 2, when the deceleration voltage $V_d$ is zero (e.g., the vehicle is either stopped or is moving at a constant or increasing velocity), as shown by the portion 26 of the voltage $V_d$ shown in FIG. 2A, no output is obtained either from VCO 11 or from multivibrator 25. When the vehicle decelerates at a relatively slow rate, as shown by the portion 27 of the $V_d$ voltage curve of FIG. 2A, the VCO 11 output voltage $V_t$ is a square wave with a frequency effectively proportional the value of $V_o$ and, hence, dependent on the sum of decelerating voltage $V_d$ and its derivative $dV_d/dt$, as shown by curve 29 of FIG. 2A. The leading (or trailing) edge of $V_t$ is used to trigger the one-shot multivibrator 25 which produces a pulse 30 having a selected fixed pulse width $w$. So long as the vehicle is so decelerating, the one-shot multivibrator is periodically triggered to produce a plurality of pulses 30 as shown, the pulse repetition rate being determined by the voltage from the operational amplifier and thereby being representative of the sum of the vehicle's deceleration and the derivative thereof. Thus, when the deceleration is at a higher level, e.g., when the brakes are applied, as shown by portion 28 of the $V_d$ voltage curve, the one-shot multivibrator 25 is triggered at a faster rate as shown.

The logic circuitry to which the pulsed signal output of multivibrator 25 and the threshold signal output of threshold circuit 14 is applied comprises a plurality of AND gates 31, 32, 33, 34, 35, 36, as shown in FIG. 2. The threshold level of circuit 14 may be varied by adjustment of variable resistor 14A as shown. Accordingly, the output of threshold circuit 14 is applied to one input of each of gates 31, 32 and 33 in the conventional polarity senses designated in FIG. 2. The outputs of gates 31, 32 and 33 are applied to one input of each of gates 34, 35 and 36, respectively, in the polarity senses shown. The braking voltage $V_b$ is applied through brake switch 19 to the other inputs of gates 31, 32 and 33 in the polarity senses shown and also to the other input of gate 35. The pulsed output of multivibrator 25 is applied to the other inputs of gates 34 and 36 in the polarity senses shown.

The outputs of gates 34, 35 and 36 are applied to OR gate 37 the output of which is fed to the base of transistor switch 38 which is connected in series with the braking voltage $V_b$ and the brake light system 15. The operation of logic gates 31–36 in accordance with the deceleration states shown in FIG. 4 is depicted by the table of FIG. 3.

Thus, as can be seen therein, if in deceleration State I the vehicle decelerates below threshold level $T_2$ of threshold circuit 14, without having the driver depress the brake pedal, (i.e., switch 19 is open), an output is present from AND gate 31 but not from AND gates 32 and 33, which produces an output at gate 34 (and no output from gates 35 and 36) only when pulses 30 from multivibrator 25 are present (represented by reference letter A in the table) so that such pulsed output is present at the output of OR gate 37 to cause transistor 38 to conduct in a pulsating fashion and thereupon accordingly apply brake light voltage $V_b$ to brake light system 15. Thus, in a decelerating situation wherein the brakes are not applied (State I) the brake lights flash "on" at a rate dependent upon the sum of the vehicle deceleration and its derivative, as shown by the brake light signals 40 and 41 of FIG. 4, for example.

If in deceleration State II the vehicle is decelerating because of the application of the brakes thereto (i.e., switch 19 is closed) and if such deceleration is below the threshold level $T_2$ (and voltage $V_d$ is below the threshold level of threshold circuit 14), an output is present at gate 32 but not at gates 31 and 33, which condition in turn produces a constant output from gate 35 (and no outputs from gates 34 and 36) so long as the brakes remain applied and switch 19 remains closed. The output of gate 35 (represented by reference letter B in the table of FIG. 3) is applied to transistor switch 38 via OR gate 37 so that in such a braking situation (State II) the brake lights 15 remain "on" so long as the brakes are applied by the driver of the vehicle. In such a situation no flashing thereof occurs, as shown by the brake light signal 42 of FIG. 4.

If in deceleration State III the vehicle is decelerating because of the application of the brakes thereto (i.e., switch 19 is closed) and if such deceleration exceeds the threshold level $T_2$, an output is present at gate 33, but not at gates 31 and 32, which condition in turn produces an output from gate 36 (and no outputs from gates 34 and 35). The output gate 36 is the inverse of the pulsed output from one-shot multivibrator 25, that is, the pulses thereof are present when the pulses of the multivibrator output are absent and vice-versa, (represented by reference letter $\overline{A}$ in the table of FIG. 3) and is applied to transistor switch 38 so that, so long as the brakes are applied and threshold $T_2$ is exceeded, the brake lights flash "off" at a rate dependent on the sum of the vehicle deceleration and its derivative, as shown by the brake light signal 43 of FIG. 4.

In summary, the system of the invention causes the brake lights of a decelerating vehicle to be flashed "on" at a rate dependent on the sum of the deceleration and its derivative when the vehicle is decelerating below a predetermined threshold level without the application of the vehicle brakes by the driver thereof. Further, the system causes the brake lights of a decelerating vehicle to remain on, without flashing, when the brakes are applied but the deceleration is below such predetermined threshold level. Finally, the system causes the brake lights to flash "off" at a frequency dependent on the sum of the deceleration and its derivative so long as the brakes remain applied and the deceleration exceeds such predetermined threshold level. As used herein the functional relationship of the flash "on" and flash "off" rates to the sum of the deceleration and its derivative may be implemented in a variety of ways. Thus, for example, the flash rates may be proportional to such sum or they may be exponentially, logarhythmically, or otherwise functionally related thereto. In any case the term "dependent on" as used herein is intended to include any such functional relationship as may be useful in a particular application.

The invention is not to be construed as limited to the specific embodiments shown and described herein except as defined by the appended claims.

The following patents were obtained in a patent search:

3,528,056   3,593,278
3,566,283   3,594,553
3,576,527

What is claimed is:

1. A vehicle brake light control system comprising
means for producing a voltage representative of the deceleration of a vehicle;
means responsive to said deceleration voltage for producing a pulsed signal having pulse repetition rate dependent on the sum of said deceleration voltage and the derivative thereof;
threshold means responsive to said deceleration voltage for producing a threshold signal when said deceleration voltage exceeds a predetermined threshold level;
means for producing a braking signal when the brakes of said vehicle are applied;
brake signal actuation circuit means responsive to said pulsed signal, said threshold signal and said braking signal for flashing on the brake light system of said vehicle at a rate dependent on the repetition rate of said pulsed signal when said vehicle is in a first state wherein it is decelerating without the application of said vehicle brakes, for turning on said brake light system when said vehicle is in a second state wherein said brakes are applied and said vehicle is decelerating at a level below said threshold level, and for flashing off said brake light system at a rate dependent on the repetition rate of said pulsed signal when said vehicle is in a third state wherein said brakes are applied and the vehicle is decelerating at a level which exceeds said threshold level.

2. A vehicle brake light control system in accordance with claim 1 wherein
said pulse repetition rate is proportional to said sum; and
said flashing on rate and said flashing off rate are proportional to said pulsed signal repetition rate.

3. A vehicle brake light control system in accordance with claim 1 and further including
means for adjusting said predetermined threshold level.

4. A vehicle brake light control system in accordance with claim 1 wherein said deceleration voltage producing means is an accelerometer.

5. A vehicle brake light control system in accordance with claim 1 wherein said deceleration voltage producing means includes
means for producing a voltage dependent on the velocity of said vehicle; and
means for differentiating said voltage to produce a voltage proportional to the derivative of said velocity.

6. A vehicle brake light control system in accordance with claim 1 wherein said deceleration voltage producing means includes
a hydraulic brake line actuator; and
a pressure transducer responsive to the actuator for producing a voltage representative of the deceleration of said vehicle.

7. A vehicle brake light control system in accordance with claim 1 wherein said pulsed signal producing means includes
an operational amplifier responsive to said deceleration voltage for producing an output voltage;
a voltage-controlled oscillator responsive to said output voltage for producing a trigger signal; and
a pulse forming circuit responsive to said trigger signal for producing said pulsed signal.

8. A vehicle brake light control system in accordance with claim 7 wherein said operational amplifier includes
amplifier means;
a first resistance-capacitance circuit connected at the input of said amplifier and responsive to said deceleration voltage;
a second resistance-capacitance circuit connected in a feedback loop between the output and the input of said amplifier, whereby said amplifier produces an output voltage when said vehicle is decelerating, said voltage being dependent on the sum of said deceleration voltage and its derivative.

9. A vehicle brake light control system in accordance with claim 7 wherein said pulse forming circuit is a one-shot multivibrator circuit.

10. A vehicle brake light control system in accordance with claim 1 wherein said brake light actuation means includes
logic circuitry for producing a first pulsed signal when said vehicle is in said first decelerating state, a constant signal when said vehicle is in said second decelerating state, and a second pulsed signal when said vehicle is in said third decelerating state, said second pulsed signal being the inverse of said first pulsed signal; and
switching means responding to said logic circuitry for actuating said brake light system in accordance with said first pulsed signal, said constant signal, or said second pulsed signal when said vehicle is decelerating.

11. A vehicle brake light control system in accordance with claim 10 wherein said logic circuitry, includes
an array of AND gates responsive to said pulsed signal, said braking signal and said threshold signal so as to produce said first pulsed signal, said constant signal, or said second pulsed signal when said vehicle is decelerating; and
an OR gate responsive to the production of said first pulsed signal, said constant signal, and said second pulsed signal to apply one of said signals to said switching means when said vehicle is decelerating.

12. A vehicle brake light control system in accordance with claim 11 wherein said switching means is a transistor and the output of said OR gate is applied to the base thereof to cause said transistor to actuate the brake light system of the vehicle.

* * * * *